(No Model.)

J. THOMSON.
GEARING.

No. 476,101. Patented May 31, 1892.

WITNESSES:
Herman T. C. Kraus
F. A. Lorcraft

INVENTOR:
John Thomson.

UNITED STATES PATENT OFFICE.

JOHN THOMSON, OF BROOKLYN, NEW YORK.

GEARING.

SPECIFICATION forming part of Letters Patent No. 476,101, dated May 31, 1892.

Application filed February 2, 1892. Serial No. 420,046. (No model.)

*To all whom it may concern:*

Be it known that I, JOHN THOMSON, a citizen of the United States, residing in Brooklyn, Kings county, State of New York, have invented certain new and useful Improvements in Gearing, of which the following is a specification.

This is an invention in gearing, the objects of which are to obtain a high relation in speed-reducing trains with smooth action, slight friction, and compact dimensions.

Figure 1:
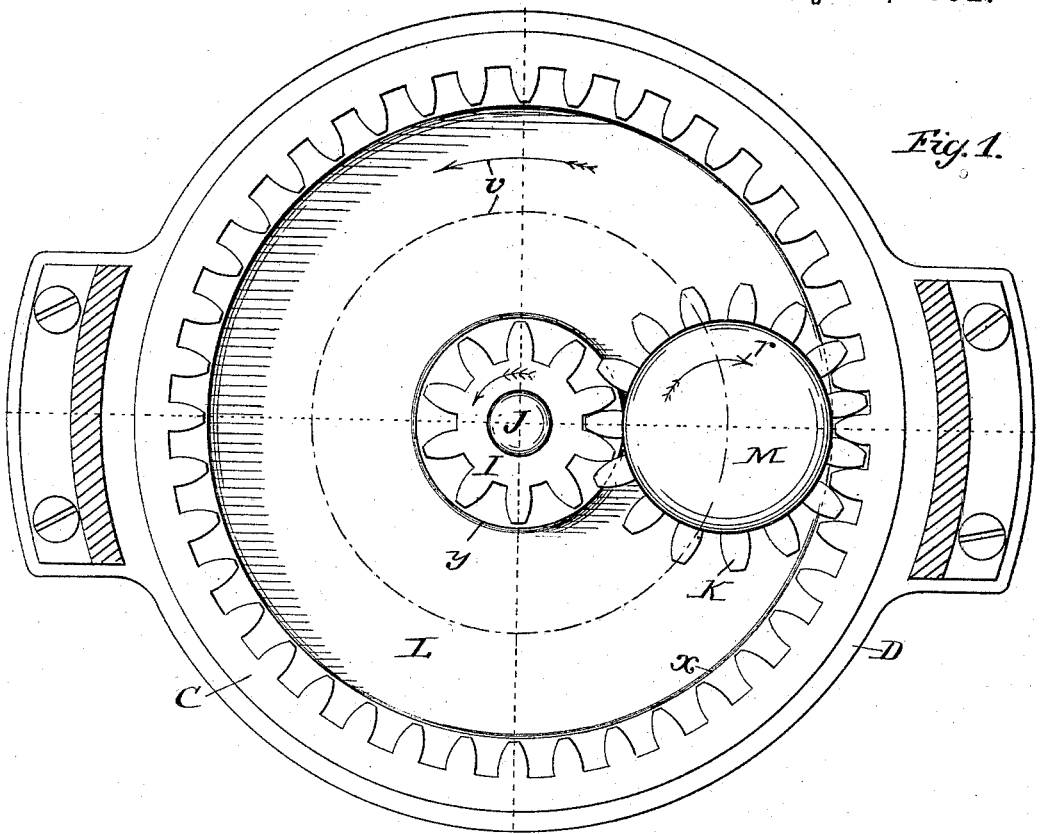
Figure 2:
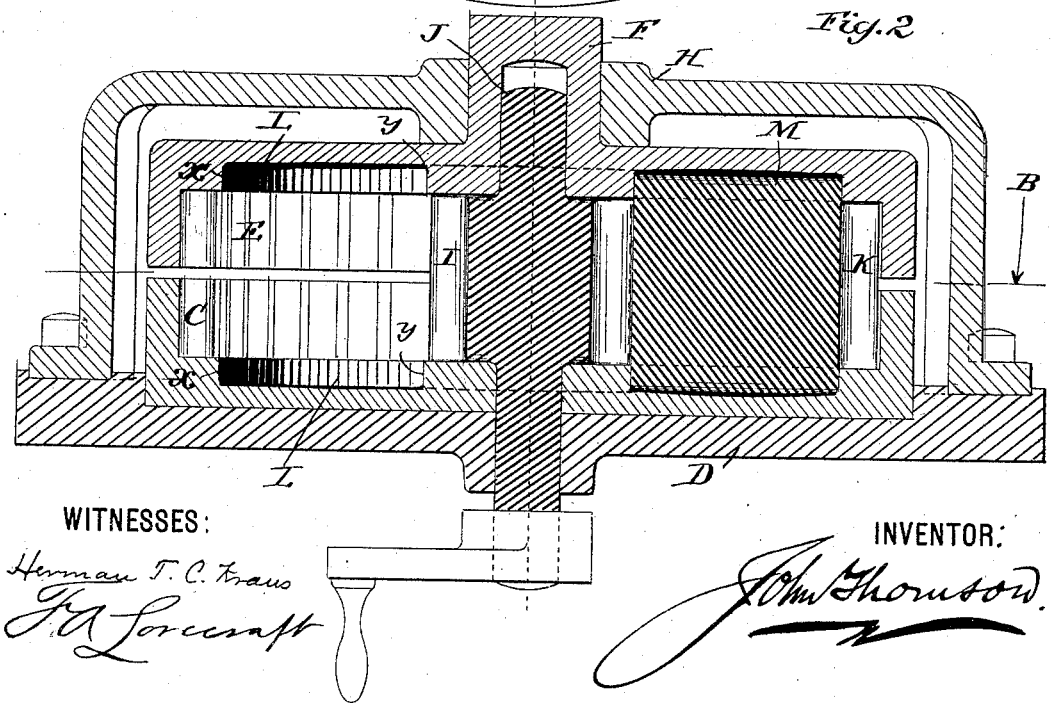

In the drawings, Figure 1 is a part top plan view, and Fig. 2 a vertical center section, of the system, Fig. 1 being taken on the line B of Fig. 2, the cross-frame H and gear E of the latter being removed.

The aforesaid objects are obtained by combining the well-known principles of epicyclic and differential gear-trains in the particular manner now to be described.

The lower internal wheel C, having forty teeth, is fixedly secured to a plate D, and is termed the "fixed wheel." The companion internal wheel E is provided with, say, thirty-nine or forty-one teeth, whose journal F is freely mounted in the cross-frame H. These internal wheels comprise the principal elements of a simple differential gear-train. The primary or driving pinion I, having ten leaves, its lower pivot mounted in the plate or the fixed wheel and its upper pivot J having a bearing within the journal F, meshes with the free intermediate spur-wheel K, having fifteen teeth, which latter is also in mesh with both of the differential gears. Now upon revolving the pinion this will communicate axial revolution to the intermediate, as arrow $r$, and will also cause the intermediate to travel in the epicycle, as arrow $v$, whence the internal wheel E will be caused to revolve axially to an extent equal to the difference in the teeth of the internal gears.

To provide for the most complete freedom of action in the intermediate gear, I form an annular groove or recess L in the inside face of each of the differential wheels, each recess being opposite to the other. The hubs or bearings M, formed upon the ends of the intermediate gear, are then adapted to operate within these recesses. The theoretically-perfect design would be when the diameter of the hubs was equal to the diameter of the pitch-line of the teeth of the intermediate gear, when the outer walls $x$ of the grooves correspond to the pitch-lines of the differential wheels, and when the inner walls $y$ correspond to the pitch-line of the pinion, as in this wise true rolling contact would take place between the thrust-resisting surfaces of the hubs and the walls of the recesses. As will be evident, however, this construction would be somewhat difficult to carry into practice, so I prefer, as shown, to cause the cylindrical surfaces of the hubs and the walls of the recess to lie sufficiently within and beyond the pitch-lines, respectively, to permit the ready cutting of the teeth, as this error of location involves but a slight degree of slip. The center of the intermediate gear may be bored out or made hollow, with its ends inclosed, whereby the rubbing friction due to its weight becomes insignificant. By this construction an important advantage in durability is derived in that the side-thrust on each and all of the bearings is uniformly distributed over their entire surface.

What I claim is—

The combination of the intermediate gear and the hubs formed thereon, the differential gears having annular grooves and the pinion, substantially as set forth.

In testimony whereof I have signed my name to this specification in the presence of two subscribing witnesses.

JOHN THOMSON.

Witnesses:
HERMAN T. C. KRAUS,
J. F. COFFIN.